(12) United States Patent
Wieczorek et al.

(10) Patent No.: US 6,713,767 B2
(45) Date of Patent: Mar. 30, 2004

(54) HYBRID TWO-DIMENSIONAL SCINTILLATOR ARRANGEMENT

(75) Inventors: Herfried Karl Wieczorek, Aachen (DE); Francisco Morales Serrano, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 31 days.

(21) Appl. No.: 10/133,866

(22) Filed: Apr. 26, 2002

(65) Prior Publication Data

US 2002/0190214 A1 Dec. 19, 2002

(30) Foreign Application Priority Data

Apr. 28, 2001 (DE) .......................... 101 21 018

(51) Int. Cl.⁷ ................................. G01T 1/20
(52) U.S. Cl. .................. 250/367; 250/361 R
(58) Field of Search .................. 250/361 R, 367, 250/363.04, 368, 483.1, 370.11, 458.1

(56) References Cited

U.S. PATENT DOCUMENTS

| | | |
|---|---|---|
| 5,059,800 A | 10/1991 | Cueman et al. |
| 5,519,227 A | 5/1996 | Karellas |
| 6,344,649 B2 * | 2/2002 | Riedner et al. ............. 250/367 |

FOREIGN PATENT DOCUMENTS

| | | |
|---|---|---|
| DE | 198 49 772 A1 | 11/1997 |
| JP | 2001027673 | 1/2001 |

* cited by examiner

Primary Examiner—Constantine Hannaher
Assistant Examiner—Timothy J. Moran
(74) Attorney, Agent, or Firm—Thomas M. Lundin, Esq.

(57) ABSTRACT

The invention relates to a hybrid two-dimensional scintillator arrangement which is formed by a plurality of one-dimensional detector strips. The detector strips (1) are formed by scintillator slabs (3) and absorber layers (2) which are glued between said scintillator slabs. The detector strips (1) are fitted parallel to one another in a fitting form (4). The one-dimensional detector strips can be manufactured with a high degree of precision. The fitting form (4) can also be manufactured with a very high degree of precision and accommodates the individual detector strips (1) in a second direction which extends perpendicularly to the direction in which the detector strips extend. The fitting form (4) is provided with transverse pieces (5), the detector strips (1) being inserted between the transverse pieces (5). The intermediate space (6) arising over the transverse pieces (5a) and between the detector strips (1) is filled with layers or a material (7) which absorb X-rays, thus enabling separation of the detector strips in the second direction.

10 Claims, 2 Drawing Sheets

HYBRID TWO-DIMENSIONAL SCINTILLATOR ARRANGEMENT

BACKGROUND

The invention relates to a two-dimensional scintillator arrangement in which detector strips which extend in a first direction are provided with scintillator slabs which are separated from one another by absorber layers.

The invention also relates to an X-ray detector provided with a scintillator arrangement. The invention furthermore relates to an X-ray examination apparatus which includes an X-ray detector with a scintillator arrangement, and to a method of manufacturing a scintillator arrangement.

X-ray detectors are used in medicine and for the non-destructive testing of materials. An X-ray detector is subdivided into pixels, at least one photosensor being associated with each pixel. The X-ray detector is then formed by a scintillator arrangement which is associated with a photosensor arrangement. Solid-state scintillators are used in conjunction with semiconductor photodiodes or a photosensor arrangement for the detection of X-rays. The luminous properties of the solid-state scintillator are used to convert the X-rays first into low-energy radiation, that is, notably visible radiation. Such visible radiation is then detected via a radiation detector for visible light which consists, for example, of photosensors. The X-rays can also be converted directly into electric charges in directly converting semiconductor materials, such charges subsequently being read out.

As the number of pixels of an X-ray detector or radiation detector increases, it becomes necessary to shield the individual pixels from one another so as to prevent crosstalk from one pixel to another by fluorescence X-ray quanta. Such crosstalk between the individual pixels leads to a deterioration of the image resolution. The individual pixels, therefore, are separated from one another by absorber layers, thus preventing crosstalk of X-ray quanta and/or light quanta from one pixel to a neighboring pixel.

When a small number of pixels is involved, it is possible in principle to form a construction of separate scintillator elements and absorber sheets.

X-ray detectors with a one-dimensional expansion can be manufactured with an adequate degree of precision. To this end, large discs of scintillator crystals are cut up and the individual scintillator slabs are assembled in an alternating fashion with absorber sheets, for example, metal foils provided with a reflective layer, or a combination of metal and synthetic foils, so as to form one-dimensionally structured detector strips.

The production of one-dimensional detector strips involves a high degree of precision. However, this level of precision cannot be achieved in the case of manufacture of two-dimensional scintillator arrangements or X-ray detectors. In order to achieve a high image quality, however, it is necessary that each pixel of the scintillator is associated with a defined photosensor. The pixels have sizes in the range of from 1 to 3 mm$^2$, so that in the case of large X-ray detectors any deviations propagate quickly and hence significantly reduce the image quality that can be achieved.

Large-area two-dimensional X-ray detectors are used in contemporary X-ray examination apparatus. Such two-dimensional X-ray detectors enable a higher image resolution to be achieved by means of a smaller or equal amount of X-rays, leading to a higher image quality and ultimately to a reduced radiation load for the patient to be examined.

U.S. Pat. No. 5,059,800 discloses a two-dimensional detector which consists of a photodetector array and a scintillator mosaic which is optically coupled thereto. The scintillator mosaic consists of fluorescent elements which are formed by cutting a fluorescent ceramic plate and are optically separated by the introduction of a reflector mass of epoxy resin and a titanium oxide filling. At a later stage the reflector mass is introduced into notches formed in the fluorescent ceramic plate by cutting; this necessitates the presence of wide cuts on at least one side of the ceramic plate. The foregoing leads to lateral surfaces of different dimensions and to a varying distribution of the fluorescent material on the upper side and the lower side of the fluorescent ceramic plate. Moreover, because of the cutting technique used, the distance of the detector strips cannot be chosen so as to be arbitrarily small; this results in a less economical use of the surface area, because large parts of the detector volume cannot be used for the absorption of incident high-energy X-rays.

SUMMARY

Therefore, it is an object of the invention to provide an arrangement which can be manufactured with a high precision and at acceptable costs.

This object is achieved by means of a scintillator arrangement in which the detector strips include scintillator slabs which are separated from one another by absorber layers and in which at least two of such detector strips are arranged essentially parallel to one another in a fitting form.

The invention is based on the insight that one-dimensional detector strips can be manufactured with a high degree of precision. When the same method for manufacturing such detector strips is used to form two-dimensional detectors, however, a lack of precision occurs.

Therefore, it is proposed to utilize a hybrid construction for two-dimensional scintillator arrangements. To this end, detector strips are manufactured which include scintillator slabs and absorber layers, the absorber layers separating the scintillator slabs from one another. The detector strips are formed by cutting scintillator wafers into strips, by bonding the strips to absorber layers and by cutting them again in a direction extending perpendicularly to the original direction of cutting. This step can be performed with a very high degree of precision, so that thin absorbers, for example, layers of lead of a thickness of 50 µm, can also be realized.

Such one-dimensional detector strips, comprising a corresponding number of scintillator slabs with intermediate absorber layers, can be manufactured with an arbitrary length, that is, within acceptable limits. Such one-dimensional detector strips with scintillator slabs and absorber layers are fitted into the high-precision fitting form in which they are fixed or bonded. As a result, the deviations of a two-dimensional scintillator arrangement thus formed can remain very small. Notably a silicon wafer or a photo-etchable glass is a suitable material for such a fitting form. Photographic techniques enable such materials to be structured with a high degree of precision and also economically and with a large elongation ratio.

In order to enable the one-dimensional detector strips to be fitted into the fitting form, a preferred embodiment of said fitting form is provided with transverse pieces which are arranged in a frame. The transverse pieces extend essentially parallel to one another and are attached to opposite sides of the frame of the fitting form. Said transverse pieces form intermediate spaces which correspond to the dimensions of the detector strips, so that the detector strips can be inserted into said intermediate spaces. The transverse pieces thus separate the neighboring detector strips. The transverse pieces facilitate insertion of the detector strips and enable high-precision alignment of the detector strips in a first and a second direction.

In a preferred embodiment of the invention it is proposed to manufacture the fitting form with the transverse pieces and the frame from a material which is not transparent to X-rays. Crosstalk of fluorescence X-ray quanta is thus prevented also in the second direction.

The fitting form preferably includes a bottom plate which is made of a material which is transparent to light. As a result, the light rays emanating from the scintillator slabs can reach the photosensor arrangement underneath the scintillator arrangement without obstruction. The bottom plate increases the stability of the scintillator arrangement. If necessary, it can be removed after the insertion of the detector strips in the fitting form. In that case it is not important whether it is transparent or not. A scintillator arrangement with a fitting form of this kind is connected or, for example, bonded, to the photosensor arrangement and to an intermediate layer, that is, if such an intermediate layer is present.

In a preferred embodiment of the invention colorants are added to the bottom plate or the bottom plate is made of a partly absorbing material, so that the light rays emanating are absorbed to a given extent. Crosstalk of the light quanta underneath the scintillator arrangement is thus prevented.

In a preferred embodiment of the invention it is proposed that the transverse pieces fill only partly the space formed between the detector strips. This space is formed by the height of the detector strips and the width of the transverse pieces over the entire length of the X-ray detector. To this end, such transverse pieces are, for example, narrower at their upper end than at their lower end where they may be arranged, if desired, on a bottom plate. The tapered transverse pieces thus formed enable simple insertion while providing a high degree of precision at the same time. In order to prevent crosstalk of X-ray quanta and/or light quanta in the second direction, the space is filled with a material which absorbs X-rays. This offers the advantage that the fitting form need not necessarily be made of a material which is not transparent to X-rays, because the separation in the second direction is realized by the X-ray absorbing material to be provided in the intermediate space then arising.

Such insertion of one-dimensional detector strips in the high-precision fitting form eliminates a further cutting step which leads to an unacceptable lack of precision when the known method is carried out. Moreover, the scintillator arrangement exhibits not only a high degree of precision but also an increased stability, because the fitting form can be made of a very stable material.

In order to enable the detector strips to be fitted in the fitting form, the transverse pieces of the fitting form in a preferred embodiment do not have the full height of the scintillator slabs or the detector strips. To this end, the transverse pieces are formed only in the lower part of the detector strips, so that adequate fixation and alignment of the detector strips can be realized. The remaining space is filled with an absorber material.

The fitting form in a preferred embodiment of the invention is constructed so as to consist of one piece only. A very high degree of precision is thus achieved for the fitting form, because the dimensions of the frame and the transverse pieces are laid down already during the manufacture and no inaccuracies can be introduced by the assembly at a later stage.

A one-piece fitting form can be realized by photoetching.

This hybrid construction of the scintillator module is particularly advantageous when the absorber layers are to be formed so as to be thin in the first direction and have a different width in the second direction. This is the case notably when the electronic circuit that is arranged on a CMOS chip underneath the scintillator arrangement has to be protected against the X-rays. The exact positioning of the transverse pieces with the absorber material over the electronic circuits is then ensured by the exact dimensions of the fitting form of glass or silicon.

The absorber layers have to be constructed so as to be thinner in the first direction than in the second direction, that is, in particular in the case of a computed tomography detector based on CMOS.

The protection of the electronic circuit against the X-rays is ensured either by using types of glass which can be structured photographically and contain a heavy metal or by filling the space remaining above the transverse pieces between the individual detector strips with X-ray absorbing layers or materials. Metal alloys having a low melting point or types of paint containing a heavy metal can be used for this purpose.

The crosstalk between the individual pixels by fluorescence X-ray quanta is prevented in the first direction by the thin absorber layers which are made, for example, of lead, and in the second direction by the glass containing a heavy metal or by the previously mentioned absorbing layers provided on the fitting form.

In the case of a fitting form which consists of one piece only and is made of silicon and has a height of only a few hundreds of $\mu$m, the crosstalk in the region of the fitting form will not be problematic, because the X-ray crosstalk can take place only at the area of the absorption of the X-ray quanta, that is, in the upper part of the scintillator crystals where the separation is ensured by absorber layers and transverse pieces with an absorber material.

The object is also achieved by means of an X-ray detector which is provided with a scintillator arrangement as claimed in the claims 1 to 8 for the conversion of X-rays into light, and a photosensor arrangement for the conversion of the light into electric charges.

Furthermore, the object is also achieved by means of an X-ray examination apparatus which includes an X-ray detector as claimed in claim 10 and an X-ray source associated with the X-ray detector.

The object is also achieved by means of a method of forming a scintillator arrangement in which elongate detector strips which consist of scintillator slabs and absorber layers bonded to said scintillator slabs and have an expansion in a first direction are formed, and in which a plurality of detector strips thus formed is adjacently arranged in a fitting form in a second direction which is perpendicular to the first direction.

DRAWINGS

An embodiment of the invention will be described in detail hereinafter with reference to the Figures. Therein:

DESCRIPTION

Figure 1:
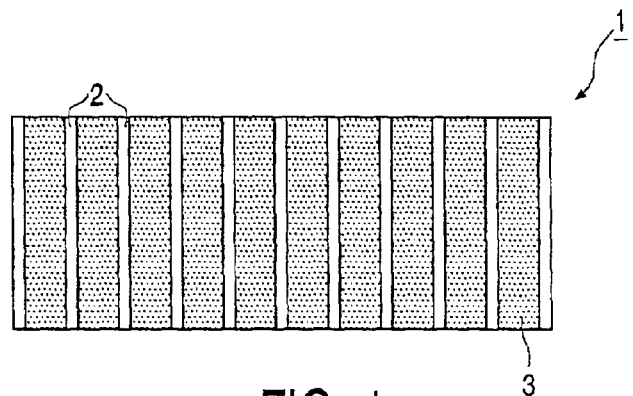
FIG. 1 is a side elevation of a one-dimensional detector strip.

FIG. 1 shows a one-dimensional detector strip 1 which consists of scintillator slabs 3 and intermediate absorber layers 2. The scintillator slabs 3 are formed by cutting scintillator wafers into strips. Such strips are then bonded to the absorber layers and finished by way of a further cutting operation in a direction perpendicular to the original cutting direction. Such one-dimensional detector strips 1 are manufactured with a geometrical precision involving deviations of 10 $\mu$m from an ideal grid with a length of 2 cm.

Figure 2:
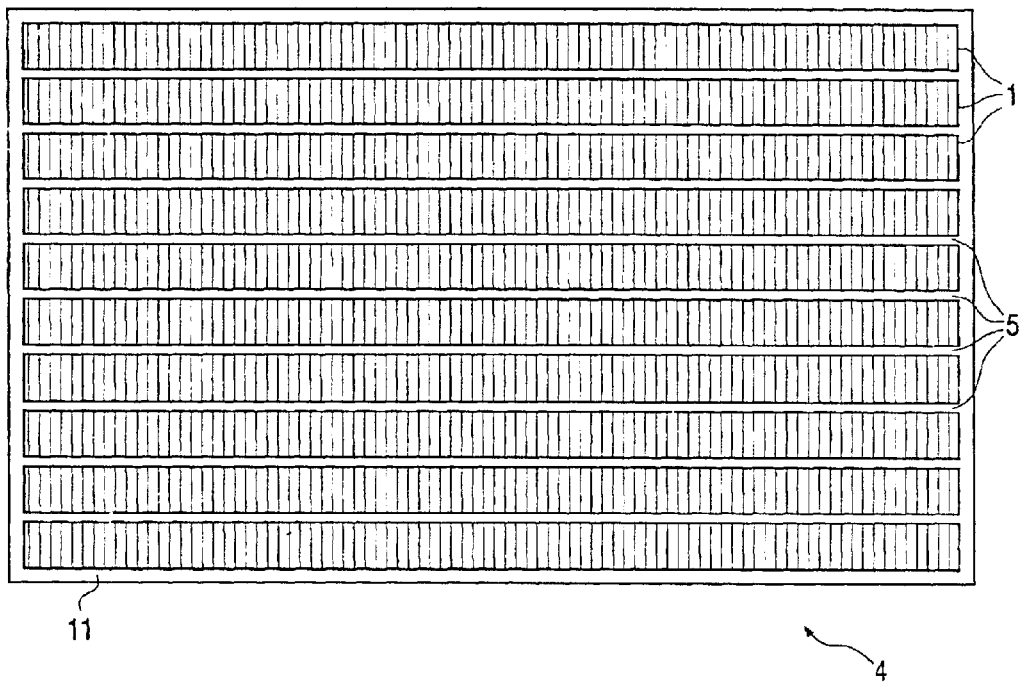
FIG. 2 is a plan view of a hybrid two-dimensional scintillator arrangement.

FIG. 2 shows a hybrid two-dimensional scintillator arrangement from above. The one-dimensional detector strips 1 are shown therein. Such one-dimensional detector strips 1 are inserted into the fitting form 4 which occupies the area of the overall X-ray detector surface. This fitting form includes a frame 11 which is adapted to the X-ray detector surface and in which transverse pieces 5 are provided, which transverse pieces are adapted to the shape of the one-dimensional detector strips 1. The detector strips 1 are separated from one another by the transverse pieces 5, thus preventing crosstalk by X-ray quanta.

Figure 3:
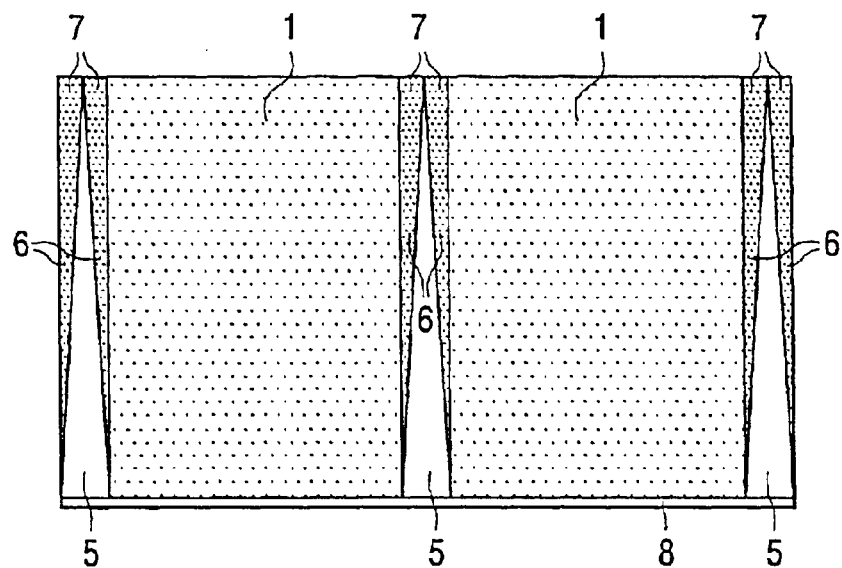
FIG. 3 is a detailed side elevation with tapered transverse pieces.

FIG. 3 is a side elevation of the hybrid two-dimensional scintillator arrangement. The transverse pieces 5 therein are provided on the bottom plate 8, the dimension of the transverse pieces 5 at their top being narrower than at their side which bears on the bottom plate 8. This tapered shape of the transverse pieces 5 allows for easy insertion of the one-dimensional detector strips 1. The intermediate space 6 between the detector strips and over the transverse pieces 5 is filled with X-ray absorbing layers 7 or material absorbing X-rays. The X-ray absorbing layers may be made of glass which is not transparent to X-rays or a powder which absorbs X-rays. Such a powder can be deposited, for example, at a later stage, in the remaining space which is formed between the transverse piece 5 on the one side and the one-dimensional detector strip 1 on the other side.

Figure 4:
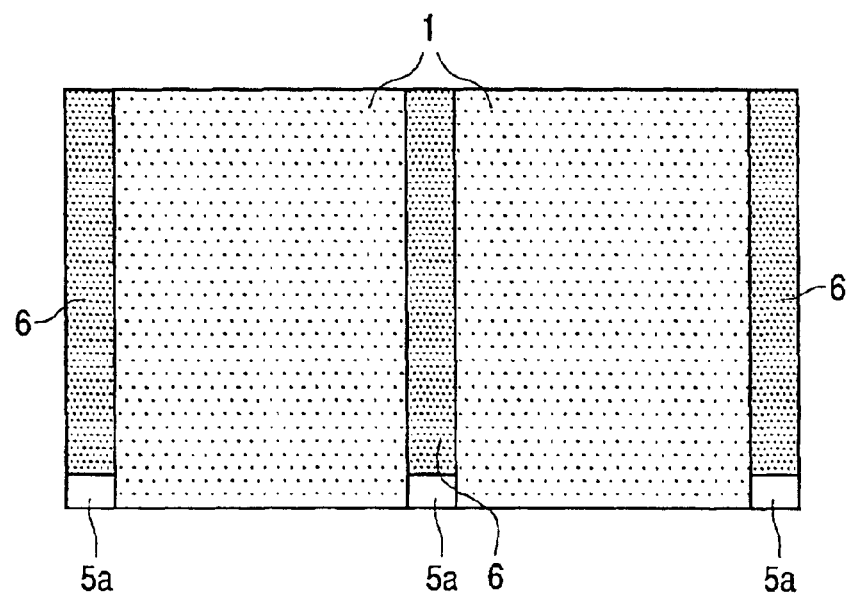
FIG. 4 is a detailed side elevation with transverse pieces of small height.

FIG. 4 is a side elevation of a hybrid two-dimensional scintillator arrangement. The transverse pieces 5a thereof are constructed so as to be significantly smaller than the height of the one-dimensional detector strips 1. This enables a correspondingly simple construction of the fitting form 4. The one-dimensional detector strips 1 are inserted between said transverse pieces 5a. The intermediate space 6 thus arising between the one-dimensional detector strips 1 is filled with a material 7 absorbing X-rays. The fitting form 4 provided with such transverse pieces 5a of small height can be realized, for example, in the form of an etched silicon chip so that a very high degree of precision is achieved once again.

The transverse pieces may also have different heights over the entire length of the X-ray detector, so that the transverse pieces are formed so as to be higher in the central region of the X-ray detector than in the vicinity of the frame. It is also possible to realize transverse pieces which have a height which is only very small in comparison with the height of the detector strips to be inserted. For example, in order to facilitate the insertion of the detector strips by means of a machine, the usually low transverse pieces may increase to the full height of the detector strips in intervals.

Depending on the type of X-ray detector, the transverse pieces may have different widths across the width of the frame of the fitting form because, for example, the resolution is higher in the central zone of the X-ray detector.

The scintillator slabs in a further embodiment are coated with a reflective layer prior to the bonding or connection to the absorber layers. Similarly, the detector strips may be provided with a reflecting layer after the bonding, but not on the side which is intended for the exit of light, that is, the lower side of the scintillator arrangement, or the side opposite from the side on which the X-rays are incident. In order to prevent light quanta which are reflected upwards towards the direction of incidence of the X-rays from emanating upwards, giving rise to a loss of signal amplitude, the scintillator arrangement is provided with a layer which reflects light rays on the upper side. When the detector strips are inserted in the fitting form, a cover plate is provided underneath the fitting form for this purpose, the light-reflecting side of the cover plate then facing the fitting form and the detector strips. After completion of the manufacturing operation, the complete scintillator arrangement with the cover plate is turned over so that the X-rays are incident on the cover plate from above, traverse the cover plate, penetrate the scintillator slabs, and are converted into light which is forced to exit downwards to the photosensor arrangement by the reflecting side coatings of the scintillator slabs and the reflecting cover plate at the top.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A scintillator arrangement comprising:
   a plurality of detector strips comprising a plurality of scintillator slabs, the scintillator slabs being separated from one another by absorber layers; and
   a fitting form wherein at least two of said plurality of detector strips are arranged essentially parallel to one another in said fitting form and wherein the fitting form comprises transverse pieces and a frame, the transverse pieces being arranged essentially parallel to one another and being attached to opposite sides of the frame.

2. A scintillator arrangement as claimed in claim 1, wherein the fitting form is impervious to X-rays.

3. A scintillator arrangement as claimed in claim 2, wherein the intermediate spaces are filled with a material which absorbs X-rays.

4. A scintillator arrangement as claimed in claim 1, wherein the transverse pieces and the frame are formed on a bottom plate which is transparent to light.

5. A scintillator arrangement as claimed in claim 4, wherein the bottom plate has a degree of absorption which is adjustable by addition of a colorant in order to prevent crosstalk of light quanta of neighboring pixels.

6. A scintillator arrangement as claimed in claim 1, wherein the transverse pieces only partly fill intermediate spaces formed between the detector strips.

7. A scintillator arrangement as claimed in claim 1, wherein the fitting form is a single piece.

8. An X-ray detector comprising:
   a scintillator arrangement for converting X-rays into light, the scintillator arrangement comprising a plurality of detector strips having a plurality of scintillator slabs, the scintillator slabs being separated from one another by absorber layers; and a fitting form wherein at least two of said plurality of detector strips are arranged essentially parallel to one another in said fitting form; and
   a photosensor arrangement for the conversion of the light into electric charges.

9. An X-ray examination apparatus comprising:

a scintillator arrangement for converting X-rays into light, the scintillator arrangement comprising a plurality of detector strips having a plurality of scintillator slabs, the scintillator slabs being separated from one another by absorber layers; and a fitting form wherein at least two of said plurality of detector strips are arranged essentially parallel to one another in said fitting form;

a photosensor arrangement for the conversion of the light into electric charges; and an X-ray source associated with the X-ray detector.

10. A scintillator arrangement comprising:

a plurality of detector strips comprising a plurality of scintillator slabs, the scintillator slabs being separated from one another by absorber layers; and a fitting form wherein at least two of said plurality of detector strips are arranged essentially parallel to one another in said fitting form and wherein the fitting form is impervious to X-rays.

* * * * *